(12) United States Patent
Nelges et al.

(10) Patent No.: US 10,605,400 B2
(45) Date of Patent: Mar. 31, 2020

(54) INSULATION MATERIAL PRELIMINARY PRODUCT AND INSULATION MATERIAL

(71) Applicant: ABB AG, Mannheim (DE)

(72) Inventors: Jörg Nelges, Mosbach (DE); Jörg Bohnenberger, Mosbach (DE)

(73) Assignee: ABB AG, Mannheim (DE)

( * ) Notice: Subject to any disclaimer, the term of this patent is extended or adjusted under 35 U.S.C. 154(b) by 223 days.

(21) Appl. No.: 13/864,728

(22) Filed: Apr. 17, 2013

(65) Prior Publication Data

US 2013/0230708 A1 Sep. 5, 2013

Related U.S. Application Data

(63) Continuation of application No. PCT/EP2011/004414, filed on Sep. 1, 2011.

(30) Foreign Application Priority Data

Oct. 29, 2010 (DE) .................... 20 2010 014 889 U

(51) Int. Cl.
| | |
|---|---|
| *F16L 59/02* | (2006.01) |
| *B32B 27/36* | (2006.01) |
| *B32B 5/26* | (2006.01) |
| *H02K 3/30* | (2006.01) |

(52) U.S. Cl.
CPC .............. *F16L 59/029* (2013.01); *B32B 5/26* (2013.01); *B32B 27/36* (2013.01); *H02K 3/30* (2013.01); *Y10T 428/24967* (2015.01); *Y10T 428/24975* (2015.01); *Y10T 442/659* (2015.04)

(58) Field of Classification Search
CPC .................................................... F16L 59/029
USPC ................................................. 442/394–399
See application file for complete search history.

(56) References Cited

U.S. PATENT DOCUMENTS

| | | | | |
|---|---|---|---|---|
| 3,261,800 A | * | 7/1966 | Collins, III .............. | C08K 3/38 250/518.1 |
| 3,309,260 A | * | 3/1967 | Boese .......................... | 442/395 |
| 3,812,074 A | * | 5/1974 | Oswitch .............. | B29C 37/0032 264/255 |
| 4,091,157 A | * | 5/1978 | Hori et al. .................... | 428/196 |
| 5,260,130 A | * | 11/1993 | Sakaguchi ............. | C09J 163/00 428/355 EP |

(Continued)

FOREIGN PATENT DOCUMENTS

| | | |
|---|---|---|
| EP | 0604804 A2 | 7/1994 |
| EP | 1383226 A1 | 1/2004 |

(Continued)

OTHER PUBLICATIONS

International Search Report (PCT/ISA/210) dated Dec. 27, 2011, by the European Patent Office as the International Searching Authority for International Application No. PCT/EP2011/004414.

*Primary Examiner* — Frank J Vineis
*Assistant Examiner* — Laura B Figg
(74) *Attorney, Agent, or Firm* — Barnes & Thornburg LLP

(57) ABSTRACT

An exemplary sheetlike insulation material precursor and an exemplary insulation material are disclosed that can feature a particularly high thermal conductivity. The insulation material precursor can be characterized in that a layer of resin on each of two outer sides of a core laminate of interconnected polyester nonwovens and a polyester film is at the B-stage and has a weight fraction of at least 5% of boron nitride.

14 Claims, 1 Drawing Sheet

(56) References Cited

U.S. PATENT DOCUMENTS

| | | | |
|---|---|---|---|
| 5,540,969 A | | 7/1996 | Schuler |
| 6,638,605 B1 * | | 10/2003 | Ankuda, Jr. ....... A41D 13/1209 |
| | | | 428/198 |
| 2003/0035960 A1 | | 2/2003 | Tsunoda et al. |
| 2004/0094325 A1 | | 5/2004 | Yoshida et al. |
| 2006/0258791 A1 | | 11/2006 | Okamoto et al. |
| 2007/0222308 A1 | | 9/2007 | Yoshida et al. |
| 2008/0066942 A1 | | 3/2008 | Miller |

FOREIGN PATENT DOCUMENTS

| | | | |
|---|---|---|---|
| EP | 1727160 A1 | 11/2006 | |
| WO | WO 2008/036151 A1 | 3/2008 | |
| WO | WO-2010117612 A2 * | 10/2010 | ............. D04H 1/544 |

* cited by examiner

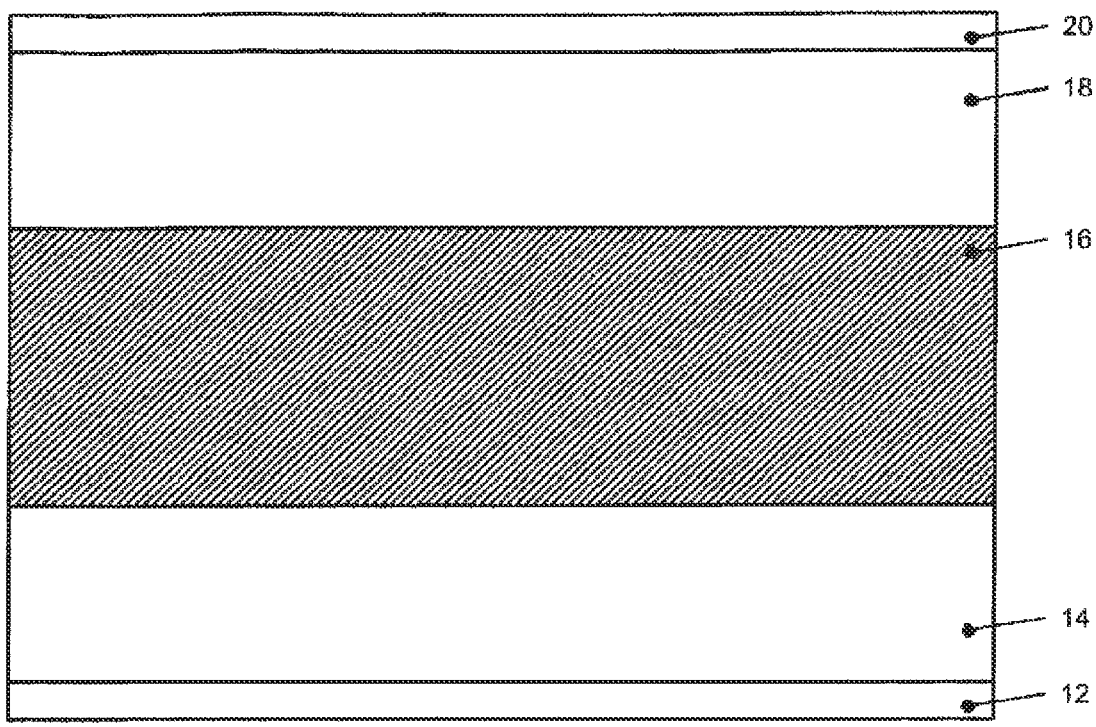

INSULATION MATERIAL PRELIMINARY PRODUCT AND INSULATION MATERIAL

RELATED APPLICATION

This application claims priority as a continuation application under 35 U.S.C. § 120 to PCT/EP2011/004414, which was filed as an International Application on Sep. 1, 2011 designating the U.S., and which claims priority to German Application 202010014889.8 filed in Germany on Oct. 29, 2010. The entire contents of these applications are hereby incorporated by reference in their entireties.

FIELD

The present disclosure relates to an insulation material precursor having a sheetlike core layer laminate with at least the following interconnected layers: polyester nonwoven, polyester film, polyester nonwoven, the two outer sides of the core layer laminate being provided with a layer of resin. The disclosure also relates to an insulation material which has been produced from an insulation material precursor as disclosed herein.

BACKGROUND

It is known that electrical conductors are electrically insulated using sheetlike insulation materials having a thickness, for example, of 0.1 mm to 2 mm. These materials are provided on rolls of suitable Width—for example, a few centimeters or greater (e.g., half a meter). A conductor of this kind may be, for example, a section of the stator winding of a motor or else of a generator, or else a Roebel rod of a generator of particularly high power—for example, several 100 MVA. However, even the stator winding of a smaller motor with a power of a few kVA or less may be electrically insulated in this way. In such arrangements, the stator winding can be arranged in radially inwardly disposed grooves of the respective hollow-cylindrical stator, the latter being constructed of correspondingly shaped sheet-metal plies lying axially adjacent to one another. Consequently it is possible either first to insert the sheetlike insulation material into the desired stator grooves and then to insert the conductor section that is to be insulated, or else first to wrap the conductor section in question and then insert it into the stator grooves.

Existing insulation materials, however, can exhibit relatively poor thermal conductivity. Consequences of this are that a heat loss developed in the stator winding cannot be dissipated adequately to the stator; that the stator winding heats up correspondingly in operation; and that the electrical resistance is increased as compared with a low conductor temperature. The cross section of the conductor of a stator winding should therefore be constructionally increased correspondingly, again involving increased use of material—of copper, for example.

SUMMARY

An insulation material precursor is disclosed, comprising: a sheetlike core layer laminate with at least the following interconnected layers: polyester nonwoven, polyester film, and polyester nonwoven; and a layer of resin on two outer sides of the core layer laminate, the resin being at a B-stage and having a weight fraction of at least 5% of boron nitride.

A method of producing an insulation material is disclosed, comprising: providing an insulation material precursor having a sheet like core layer laminate with at least the following interconnected layers: polyester nonwoven, polyester film, and polyester nonwoven; and a layer of resin on two outer sides of the core layer laminate, the resin being at a B-stage and having a weight fraction of at least 5% of boron nitride; and temporarily heating the insulation material precursor to a baking temperature.

An electric motor is disclosed, comprising: a hollow-cylindrical stator which extends along a line and which on an radial inner wall has a plurality of stator slots which are arranged predominantly parallel to the line, and in which sections of a conductor of an electrical stator winding of the electric motor are arranged; and sections which evelope the conductor by an insulation material having a sheet like core layer laminate with at least the following interconnected layers: polyester nonwoven, polyester film, and polyester nonwoven; and a layer of resin on two outer sides of the core layer laminate, the resin being at a B-stage and having a weight fraction of at least 5% of boron nitride.

BRIEF DESCRIPTION OF THE DRAWINGS

Further features, and further advantages will be described in more detail using the exemplary embodiments shown in the drawing, wherein:

FIG. 1 shows an exemplary layer construction of an insulation material precursor.

DETAILED DESCRIPTION

An exemplary sheetlike insulation material precursor and an exemplary insulation material are disclosed that can feature a particularly high thermal conductivity.

An insulation material precursor and an insulation material can be of the type specified at the outset. The insulation material precursor can be characterized in that the resin is at the B-stage and has a weight fraction of at least 5% of boron nitride.

Boron nitride is an electrically insulating, crystalline material having high thermal conductivity and hardness; particles suitable in accordance with the present disclosure can be present in slice-like form with a diameter of above about (e.g., ±10%) 1 μm or greater (e.g., up to 30 μm or more). With smaller diameters, however, the particles tend to be more beadlike. They can be incorporated with particular advantage, by mixing, into a liquid resin, which can then be applied to the core layer laminate. An exemplary suitable particle diameter may be, for example, 1 μm to 5 μm or lesser or greater. Depending on the desired thickness of the resin layer to be applied, it is entirely possible for boron nitride particle diameters of 10 μm or more to be rational; however, in exemplary embodiments, the particle diameter ought not to exceed the advised layer thickness significantly—for example, by a factor of more than two or three.

B-stage of a resin means that the curing process of the resin has already been commenced but has then been deliberately interrupted, so that the resin is in a state of incomplete polymerization. B-stage of a resin may also, however, mean that the resin, as a result of corresponding heating to a melting temperature of 80° C., for example, and subsequent cooling, has undergone transition to a solid state, without the actual chemical reaction of polymerization having already been initiated. In such a state, the resin can be melted again at a corresponding temperature, with the actual polymerization taking place at a temperature above the melting temperature—for example, at a baking temperature in the range from 120° C. to 140° C. (or lesser or greater).

On coating at the liquid A-stage, by means of a roll with a corresponding surface structure, for example, the resin is applied to the outer sides of the core layer laminate, which then, in a subsequent drying process, is passed, for example, through an oven, which is at a temperature such that the resin does go into the B-stage, but a polymerization is substantially avoided. The resin, together with the boron nitride particles present within it, has already penetrated at least partly into the polyester nonwoven layers, and so in this respect as well, for example, the thermal conductivity is improved.

In accordance with exemplary embodiments, the resin of the insulation material precursor is at the B-stage. Therefore it is mechanically more flexible and can be introduced in a particularly simple way around a conductor that is to be electrically insulated, or into a stator groove of a motor or generator, if the latter is being manufactured. In this condition, the full electrical insulation capacity has not yet been attained, however. It may expressly be noted at this point that the insulation material precursor, as it is understood for the purposes of this disclosure, of course already on its own has electrical insulation properties, by virtue of the polyester film; however, it is in fact not used as an insulation material, and subjected operationally to a voltage, until the resin layer has been baked. For this purpose, the insulation material precursor, together with, for example, the stator and the stator winding or windings in question, is to be heated to a baking temperature of, for example, 120° C. to 140° C., so that the resin, with added boron nitride, becomes liquid again, accordingly adapts in terms of its shape to the circumstances in, for example, the stator groove, and also penetrates even further, together with the boron nitride particles, into the polyester nonwoven, and then polymerizes, hardening in the process. The insulation material thus formed advantageously has a heightened thermal conductivity, particularly with regard to the connected polyester nonwoven/resin layers.

In accordance with one exemplary preferred embodiment, the weight fraction of the boron nitride in the resin is in a range from 10% to 20% (or lesser or greater). Here, on the one hand, the effect of the improved thermal conductivity is very greatly pronounced, in a factor of 3 to 5, for example, relative to a resin layer without added boron nitride, while on the other hand, the polymerization of the resin is not lastingly affected by the boron nitride particles of, for example, preferably relatively low diameter.

In an exemplary preferred way, the material of the polyester film of the core layer laminate can also have an addition of boron nitride in a weight fraction of at least 1%, or even, for example, 2% to 5%. This weight fraction, however, is lower than the boron nitride addition in the case of the resin, since it is desired to prevent the mechanical strength of the film being affected by the slice-like boron nitride particles. If desired, boron nitride particles can be added to the film material as well, and with an even somewhat smaller diameter than the boron nitride particles of the resin, in order thus to achieve an increased fraction of boron nitride for enhanced thermal conductivity while at the same time affecting the strength of a film to the smallest degree possible.

In accordance with a further exemplary embodiment of the insulation material precursor, the layers of the core layer laminate are connected by means of an adhesive which has a weight fraction of, for example, at least 1% of boron nitride, or even, for example, 2% to 5%, and even, indeed, up to 20%. The use of an adhesive is unavoidable for producing a mechanical connection between the layers of the laminate, the layer of adhesive likewise being a basis for an adverse effect on the thermal conductivity of the laminate. The technical effect of the boron nitride corresponds to that specified above and once again it may be noted explicitly that on lamination, together with the boron nitride particles as well, the adhesive undergoes at least partial penetration into the polyester nonwoven and can advantageously increase the thermal conductivity thereof, from its inside as well.

In accordance with an exemplary preferred embodiment of the insulation material precursor, the polyester film has a thickness in the range from, for example, 25 μm to 350 μm, more preferably, for example, 100 μm. The polyester nonwovens, in accordance with a further, variant embodiment, have a thickness in the range from, for example, 25 μm to 130 μm, more preferably, for example, 50 μm. In manufacturing terms, these are in each case readily manageable layer thicknesses which, moreover, in the assembly can ensure a sufficiently high dielectric strength, in the range from 3 kV to 35 kV, for example.

The thickness of the applied resin layers can, for example, preferably feature in each case a thickness in the range from 8 μm to 50 μm, the resin on application still being at the liquid A-stage and already at least partly penetrating the polyester nonwovens. The thickness of the resin layer is guided on the one hand by the extent to which it is, or is able, to penetrate the polyester nonwoven, and on the other hand by the amount of resin that is to be still present on the surfaces, in the form of pure resin layer. For example, in the case of a groove in a stacked core of a stator, with an insulation material precursor being introduced into the groove, a resin layer thickness in the upper layer thickness range may well be advantageous, since the resin is then able to penetrate also, for example, into the column formed by adjacent sheet-metal plies in the stacked core upon becoming liquid at a baking temperature of 120° to 140°.

The resin of the insulation material precursor is, for example, preferably an epoxy resin and more preferably can be the epoxy resin LG9968 from the manufacturer Hexion. This resin has emerged as being particularly suitable in terms of its thermal and mechanical properties, in conjunction with an addition of boron nitride. The boron nitride from the manufacturer Momentive has also proven particularly suitable.

An insulation material is also disclosed which has been formed by temporarily heating an insulation material precursor disclosed herein to a baking temperature of, for example, 120° C. to 140° C., as already described.

Exemplary advantages of an insulation material disclosed herein are manifested with particular advantage in the case of an electric motor or generator having a hollow-cylindrical stator which extends along a line and which, on its radial inner wall, has a plurality of stator slots arranged predominantly parallel to the line, with sections of a conductor of an electrical stator winding of the electric motor being arranged in the slots, the conductor being enveloped at least in sections by an insulation material as disclosed herein. Here, the effect of the improved conduction of heat away from the stator winding in the stator is that the cross section of the stator winding can be reduced.

FIG. 1 shows an exemplary layer construction of an insulation material precursor 10 with a sequence of the individual layers that is in accordance with the present disclosure, exemplary layers having the following respective reference symbols:

12: 15 μm of a resin at the B-stage—for example, Hexion Epenol 9968-LG

14: 50 μm polyester nonwoven,
16: 100 μm polyester film with an addition of approximately 10% of boron nitride material,
18: 50 μm polyester nonwoven,
20: 15 μm of a resin at the B-stage—for example, Hexion Epenol 9968-LG After a respective heating operation to 140° C., for example, the resin layers 12, 20 have at this point already been at least partly drawn by suction into the cavities in the adjacent polyester nonwovens 14, 18, and together with these nonwovens they form a solid insulant, with the resin being fully polymerized at this point. Between the polyester film 16 and the polyester nonwovens 14, 18 adjacent to it on either side, the core layer laminate can have a respective layer of an adhesive which to an extent, a 5%-10% weight fraction, for example, has been admixed with boron nitride. This is an amount which does not yet sustainably reduce the adhesive effect. In this context, however, it should be ensured that the boron nitride particle size selected is relatively low, from 1 μm to 5 μm, for example, since it is specifically the larger particles, with a diameter of 10 μm or more, for example, that may superproportionally reduce the adhesive effect.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 10 exemplary layer construction of an insulation material precursor
12 first individual layer of resin at the B-stage
14 first individual layer of polyester nonwoven
16 polyester film layer
18 second individual layer of polyester nonwoven
20 second individual layer of resin at the B-stage

The invention claimed is:

1. An electrical insulation material precursor for electrical resistance with high thermal conductivity, comprising:
   a sheetlike core layer laminate having two outer sides, the core layer laminate including at least the following interconnected layers:
   polyester nonwoven,
   polyester film, and
   polyester nonwoven; and
   a layer of resin on the two outer sides of the core layer laminate, the resin being at a B-stage and having a weight fraction of boron nitride within a range of 10% to 20%, thermal conductivity of the layer of resin being greater, by a factor of 3-5, than thermal conductivity of the resin without boron nitride,
   wherein the polyester film has a thickness in a range from 25 μm to 350 μm, wherein the polyester nonwovens have a thickness in a range from 25 μm to 130 μm, and
   wherein the layers of the core layer laminate are joined with an adhesive which has a weight fraction of at least 1% of boron nitride.

2. The electrical insulation material precursor as claimed in claim 1, wherein a material of the polyester film of the core layer laminate features an addition with a weight fraction of at least 1% of boron nitride.

3. The electrical insulation material precursor as claimed in claim 1, wherein the resin layer on each of the two outer sides has a thickness in a range from 8 μm to 50 μm.

4. The electrical insulation material precursor as claimed in claim 1, wherein the resin is an epoxy resin.

5. The electrical insulation material precursor as claimed in claim 1, wherein the polyester film is formed between the polyester nonwoven films.

6. The electrical insulation material of claim 1, wherein the adhesive forms a continuous bond between at least two of the layers of the core layer laminate.

7. An electrical insulation material precursor for electrical resistance with high thermal conductivity, comprising:
   a sheetlike core layer laminate with at least the following interconnected layers:
   polyester nonwoven,
   polyester film, and
   polyester nonwoven; and
   a layer of resin on two outer sides of the core layer laminate, the resin being at a B-stage and having a weight fraction of boron nitride within a range of 10% to 20%, thermal conductivity of the resin being greater, by a factor of 3-5, than the resin without boron nitride,
   wherein the polyester film has a thickness in a range from 25 μm to 350 μm, wherein the polyester nonwovens have a thickness in a range from 25 μm to 130 μm,
   wherein the layers of the core layer laminate are joined with an adhesive which has a weight fraction of at least 1% of boron nitride, and
   wherein the polyester film is arranged adjacent to each of the polyester nonwovens.

8. The electrical insulation material precursor as claimed in claim 7, wherein a material of the polyester film of the core layer laminate features an addition with a weight fraction of at least 1% of boron nitride.

9. The electrical insulation material precursor as claimed in claim 7, wherein a resin layer on each of the two outer sides has a thickness in a range from 8 μm to 50 μm.

10. The electrical insulation material precursor as claimed in claim 7, wherein the resin is an epoxy resin.

11. The electrical insulation material precursor as claimed in claim 7, wherein the polyester film is formed between the polyester nonwoven films.

12. Method of producing an electrical insulation material for electrical resistance with high thermal conductivity, comprising:
   providing an electrical insulation material precursor having a sheet like core layer laminate with at least the following interconnected layers:
   polyester nonwoven,
   polyester film, and
   polyester nonwoven; and
   a layer of resin on two outer sides of the core layer laminate, the resin being at a B-stage and having a weight fraction of boron nitride within a range of 10% to 20%, thermal conductivity of the resin being greater, by a factor of 3-5, than thermal conductivity of the resin without boron nitride, wherein the polyester film has a thickness in a range from 25 μm to 350 μm, wherein the polyester nonwovens have a thickness in a range from 25 μm to 130 μm, wherein the layers of the core layer laminate are joined with an adhesive which has a weight fraction of at least 1% of boron nitride; and
   temporarily heating the insulation material precursor to a baking temperature.

13. An electric motor, comprising:
a hollow-cylindrical stator which extends along a line and which, on a radial inner wall, has a plurality of stator slots which are arranged predominantly parallel to the line, and within which sections of a conductor of an electrical stator winding of the electric motor are arranged; and
the sections of the conductor being enveloped by an electrical insulation material for electrical resistance with high thermal conductivity, the electrical insulation material having a sheet like core layer laminate with at least the following interconnected layers:
polyester nonwoven,
polyester film, and
polyester nonwoven; and
a layer of resin on two outer sides of the core layer laminate, the resin being at a B-stage and having a weight fraction of boron nitride within a range of 10% to 20%, thermal conductivity of the resin being greater, by a factor of 3-5, than thermal conductivity of the resin without boron nitride,
wherein the polyester film has a thickness in a range from 25 μm to 350 μm, wherein the polyester nonwovens have a thickness in a range from 25 μm to 130 μm, and
wherein the layers of the core layer laminate are joined with an adhesive which has a weight fraction of at least 1% of boron nitride.

14. The electrical insulation material precursor as claimed in claim 13, wherein a material of the polyester film of the core layer laminate features an addition with a weight fraction of at least 1% of boron nitride.

\* \* \* \* \*